United States Patent [19]

Peters

[11] Patent Number: 4,799,876

[45] Date of Patent: Jan. 24, 1989

[54] BLOW MOLDING APPARATUS

[75] Inventor: Donald L. Peters, Bartlesville, Okla.

[73] Assignee: Phillips Petroleum Company, Bartlesville, Okla.

[21] Appl. No.: 158,440

[22] Filed: Feb. 22, 1988

[51] Int. Cl.[4] ............................................. B29C 49/60
[52] U.S. Cl. .................................... 425/536; 264/523
[58] Field of Search ............... 425/525, 531, 532, 535, 425/536, 182, 522; 264/523, 524, 525; 277/173, 201

[56] References Cited

U.S. PATENT DOCUMENTS

| T890,013 | 9/1971 | Lawrence | 425/525 |
|---|---|---|---|
| 3,329,996 | 7/1967 | Marcus et al. | 425/532 |
| 3,338,998 | 8/1967 | Settembrini | 264/525 X |
| 3,371,376 | 3/1968 | Fischer et al. | 425/532 |
| 3,571,848 | 3/1971 | Szajna | 425/536 |
| 3,752,621 | 8/1973 | Shelby | 425/536 X |
| 3,899,278 | 8/1975 | Fead et al. | 425/531 |
| 3,932,084 | 1/1976 | Reilly | 425/182 |
| 3,973,896 | 8/1976 | Peters | 425/536 |
| 4,025,276 | 5/1977 | Peters | 425/536 |
| 4,032,278 | 6/1977 | Kuenzig et al. | 425/525 |
| 4,225,303 | 9/1980 | Crisci | 425/525 |
| 4,234,299 | 11/1980 | Kuenzig et al. | 425/292 |
| 4,266,927 | 5/1981 | Gilbert et al. | 425/526 |
| 4,574,965 | 3/1986 | Meierhoefer | 215/32 |

FOREIGN PATENT DOCUMENTS 3811831 7/1963 Japan .................... 425/536

Primary Examiner—Richard L. Chiesa
Attorney, Agent, or Firm—William R. Sharp

[57] ABSTRACT

Blow molding of a parison with a blow needle is aided by the use of a sealing member which includes at least one projection which completely surrounds the blow needle. During inflation of the parison, the projections come into sealing contact with the exterior surface thereof so as to effectively prevent leakage of blow gas from the interior of the parison around the blow needle.

14 Claims, 3 Drawing Sheets

BLOW MOLDING APPARATUS

BACKGROUND OF THE INVENTION

This invention relates to an apparatus and method for blow molding an article from a parison.

According to one type of conventional blow molding technique, a blow needle is employed to puncture a parison for the purpose of extending the needle into the parison and introducing air into the parison from the end of the needle to thereby inflate the parison and force its walls against the surface of a mold to produce a molded article. One significant problem which arises in such blow molding techniques is the tendency of air within the parison to leak therefrom through gaps between the parison wall and the blow needle. Such undesirable gaps frequently arise from the puncturing of the parison wall, and are then further increased in size by air pressure within the parison and the forces of gravity, particularly with heavy parison walls, which tend to pull the parison wall away from the blow needle. Air which leaks from within the parison through such gaps tends to flow between the mold surfaces and the parison, and results in the loss of air pressure within the parison which causes poor definition and warpage of the finished molded article. Leakage of air from the parison can also cause poor cooling of the parison and consequent low production rates.

SUMMARY OF THE INVENTION

It is, therefore, an object of the invention to provide a blow molding apparatus and method which employ a blow needle wherein a loss of air pressure within the parison due to leakage around the blow needle is effectively prevented.

The above object is satisfied by a blow molding apparatus which comprises: a mold means which includes a pair of movable mold halves which are adapted to receive a parison in a cavity defined therebetween; blow means which includes a blow needle having a blow gas outlet end which is adapted to puncture the parison and extend into the interior of the parison; and sealing means which includes a plurality of generally concentric projections which completely surround the blow needle. Each projection has a first end, with inner and outer closed boundaries, and also a second end, wherein each projection extends from the first end to the second end in a direction generally toward the parison cavity and generally parallel to the longitudinal axis of the blow needle. Further, the sealing means is capable of assuming at least one position such that the projections extend into the cavity, whereby a parison can come into sealing contact with the projections at its exterior surface while the blow needle extends into the interior of the parison during blow molding thereof.

According to another aspect of the invention, a blow molding method is provided which comprises: positioning a parison in a cavity defined between two mold halves; puncturing the parison with a blow needle so as to extend the needle into the interior of the parison; passing a gas from the outlet end of the blow needle so as to inflate the parison; providing a sleeve around the blow needle, wherein the sleeve has at least one projection extending therefrom which surrounds the blow needle; positioning the sleeve with respect to the parison so that the projection extends into the cavity so as to contact the exterior surface of the parison, where the parison puncturing step is performed before the projection contacts the parison; and completing inflation of the parison so as to form a molded article.

Two preferred embodiments of the invention are specifically described hereafter. In each of these embodiments, the above-mentioned sleeve is selectively movable between an extended position in which the projections extend into the mold cavity, and a retracted position in which the projections are withdrawn from the cavity. In the first embodiment, the sleeve is fixedly attached to the blow needle, whereas in the second embodiment the sleeve is freely reciprocable with respect to the blow needle and is moved from one position to another position by means of bosses radially extending from the blow needle which are adapted to abut portions of the sleeve and move the sleeve in response to movement of the blow needle.

In accordance with the invention, the parison makes sealing contact with the sealing means at the projections so that the parison wall conforms to the shape of the projections. Therefore, the blow gas, most typically air, is prevented from leaking from the parison and into the area between the parison and the mold halves. Furthermore, sealing engagement of the parison with the projections serves to effectively prevent undesirable movement of the parison wall away from the blow needle. As discussed previously such movement of the parison wall from the blow needle increases leakage of blow gas from the parison.

DETAILED DESCRIPTION OF THE INVENTION

Preferred embodiments of the invention will now be described with reference to the drawings.

Figure 1:
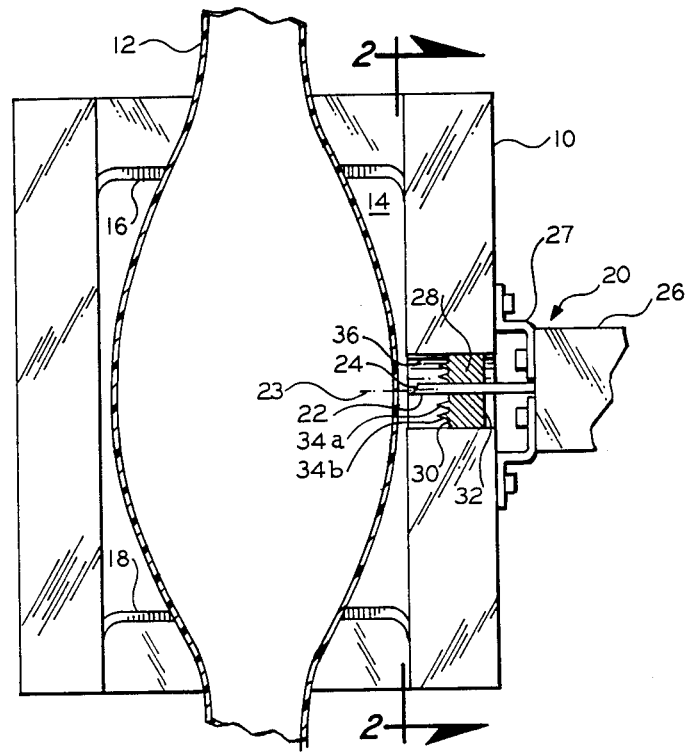
FIG. 1 is a partial cross-sectional view of an apparatus in accordance with a first embodiment of the invention.

Referring to FIG. 1, an apparatus is shown in accordance with a first embodiment of the invention. The illustrated apparatus includes a mold half 10 and also another mold half which is not shown which are together adapted to receive a parison 12 in a cavity 14 defined between the mold halves. Parison 12 is shown in what is called a "pre-blown" condition wherein the parison is partially inflated by means of gas introduced therein from an extruder (not shown) from which the parison is extruded above the upper end of parison 12. This pre-blown condition is obtained immediately prior to closure of the mold halves. Mold half 10 includes pinched off areas 16 and 18 which are adapted to pinch upper and lower respective portions of parison 12 upon closure of the mold halves so as to prevent flow of blow gas from such upper and lower parison portions.

A blow means 20 is provided which includes a blow needle 22, having a blow gas outlet end 24 and longitudinal axis 23, which is adapted to puncture parison 12 with outlet end 24 so as to extend into the interior of the parison 12 for inflation thereof as will be discussed in detail with reference to FIGS. 3-5. Blow means 20 further comprises a reciprocating drive means 26, mounted to a mold half 10 by means of bracket 27, for effecting reciprocating movement of blow needle 22 between extended and retracted positions as will also be further discussed with respect to FIGS. 3-5.

The illustrated apparatus further includes a sealing means 28 which comprises a generally annular sleeve, preferably constructed of a metal such as bronze or brass, which fits around blow needle 22 so as to be generally coaxial therewith and so as to be attached, by suitable means such as welding, to needle 22 at an inner surface of sleeve 28. Sleeve 28 further has longitudinally separated (with respect to needle longitudinal axis 23) ends 30 and 32 where end 30 is closest to the outlet end 24 of blow needle 22, and further wherein a pair of projections as shown at 34a and 34b are provided at end 30. Although two projections are shown in the illustrated embodiment, it should be understood that any number of projections can be employed according to certain aspects of the invention.

As further shown in FIG. 1, a passageway 36 is partially defined by mold half 10. The other half of passageway 36 is defined by the other mold half not shown in FIG. 1. Passageway 36 receives sleeve 28 and blow needle 22 in a manner allowing reciprocable movement of sleeve 28 and blow needle 22 therein. The term "reciprocable" as used herein means that the element so disposed in passageway 36 is capable of reciprocating, longitudinal movement within passageway 36.

Figure 2:
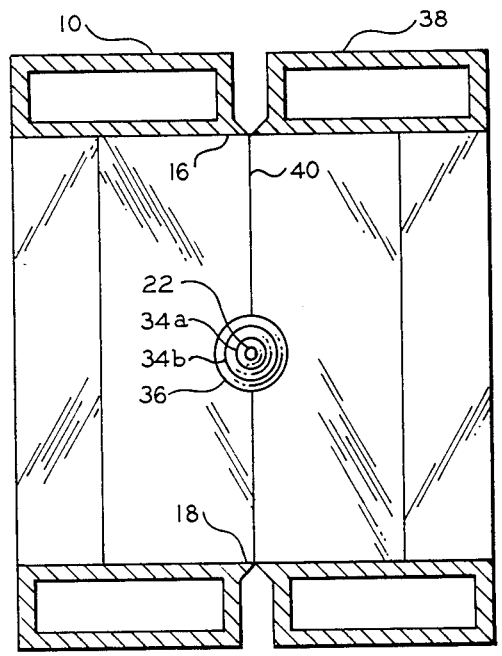
FIG. 2 is a cross-sectional view of the apparatus of FIG. 1 as viewed along lines 2—2.

Referring now to FIG. 2, there is shown a cross-sectional view of the FIG. 1 apparatus as viewed along lines 2—2. Mold half 10 as well as the other mold half 38 are shown as mated together along parting line 40. Passageway 36 is positioned along parting line 40 in the illustrated embodiment, but it is within the scope of the invention to position the passageway at other locations with respect to the mold halves. It can also be seen from FIG. 2 that projections 34a and 34b are generally concentric and completely surround blow needle 22. Preferably projections 34a and 34b are generally annular in shape as shown, although other shapes are within the scope of the invention as long as the projections completely surround the blow needle.

Figure 3:
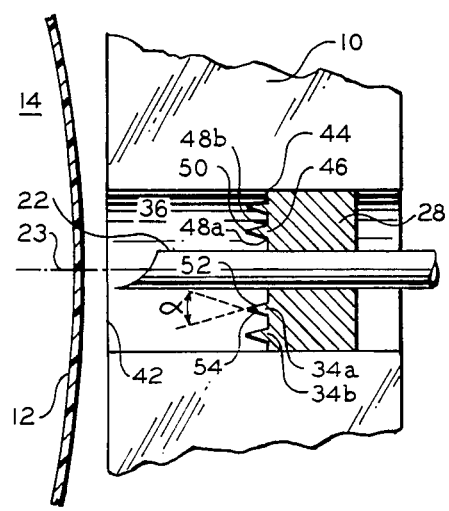
FIGS. 3–5 are close-up views of a portion of the apparatus shown in FIG. 1, and illustrate the operation of the inventive apparatus.
Figure 4:
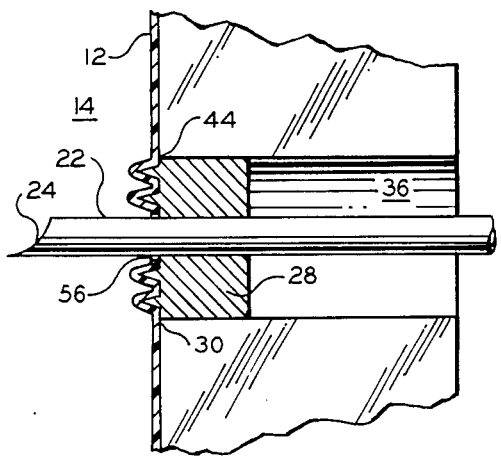
Figure 5:
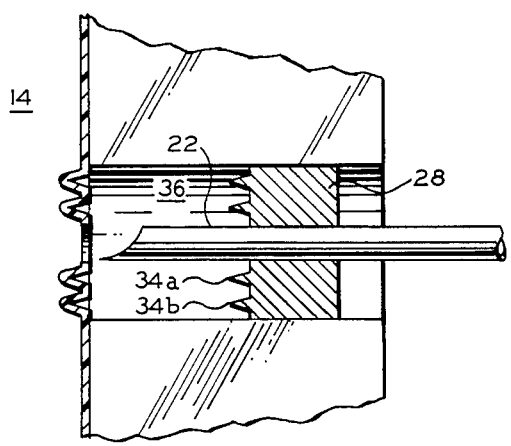

A portion of the apparatus of FIGS. 1 and 2 will now be more specifically described referring to FIGS. 3-5.

Referring to FIGS. 3-5, blow needle 22 is reciprocably disposed within passageway 36 so as to be movable between a retracted position, as shown in FIGS. 3 and 5, and an extended position as shown in FIG. 4. In the extended position blow needle 22 extends into the cavity 14, and in the retracted position blow needle 22 is withdrawn from cavity 14. Sleeve 28 is also reciprocably disposed within passageway 36 so as to be selectively moveable between a retracted position, as shown in FIGS. 3 and 5, and an extended position as shown in FIG. 4. In the retracted position the projections are withdrawn from cavity 14 whereas in the extended position the projections extend into cavity 14.

Passageway 36 has an end 42 which communicates with cavity 14 as shown in FIG. 3. As shown in FIG. 4, where sleeve 28 is in the extended position, end 30 of sleeve 28 has an outer edge as shown at 44. Preferably, the outer edge 44 of sleeve 28 is approximately flush, as shown, with the interior surface of the mold halves immediately adjacent to passageway end 42 when the sleeve is in its extended position. This is preferable since it provides a smooth continuous surface from the mold halves to the outer edge of the sleeve so as to provide optimum sealing contact between the sleeve projections and parison 12.

Referring back to FIG. 3, projection 34a has an end 46, with an inner closed boundary 48a and an outer closed boundary 48b, and also another end 50. As shown, projection 34a extends from end 46 to end 50 in a direction generally toward cavity 14 and generally parallel to needle longitudinal axis 23.

Projection 34a can be further characterized as converging to a generally sharp edge at end 50 such that the cross-section of the projection is generally triangular in shape. This particular shape is advantageous insofar as it facilitates easy separation of a molded parison therefrom and provides excellent sealing contact between the projection and the parison. However, other projection cross-sectional shapes are within the scope of the invention, such as rectangular, etc. Further as shown in FIG. 3, projection 34a has a first side surface 52 which extends from inner boundary 48a to end 50, and a second side surface 54 which extends from outer boundary 48b to end 50 so that each side surface connects at end 50. Preferably, the side surfaces 52 and 54 define an acute angle $\alpha$ therebetween of about 20° to about 30°. This angle results in a highly uniform wall thickness of parison 12 when in sealing engagement with the projection, as shown at FIG. 4 for example. Note that achieving such uniform wall thickness is a problem since the parison wall is thinned, sometimes nonuniformly, across end 30 of the sleeve during blow molding. An angle smaller than the above-mentioned preferred angle tends to thin the parison wall at end 50 to an undesirable degree so as to risk rupture of the parison wall. A larger angle results in an undesirable parison wall thickness at end 50 and thinner wall thicknesses adjacent the inner and outer boundaries of the projection.

Projection 34b is substantially similar in structure to projection 34a, and has inner and outer boundaries like projection 34a. Preferably, as shown, the inner and outer boundaries of projections 34a and 34b are generally coplanar with respect to a plane which is generally perpendicular to needle longitudinal axis 23.

Preferably, projections 34a and 34b are spaced from one another, and are respectively spaced from the blow needle 22 and sleeve outer edge 44. More precisely, it can be generally stated for a plurality of projections that the inner boundary of the innermost projection, in this case projection 34a, is spaced from the blow needle, and that the inner boundary of each of the remaining projections, in this case only projection 34b, is spaced from the outer boundary of an immediately adjacent projection, here projection 34a, and finally that the outer boundary of the outermost projection, projection 34b, is spaced from the outer edge 44 of sleeve 28. Spacing the projections from each other and from the blow needle and the outer edge of the sleeve provides for optimum sealing contact between the parison and the sleeve 28. Providing such spacing enables the parison wall to lie relatively flatly against the sleeve surfaces occupying the above-described spaces as can be seen in FIG. 4 for example. Therefore, contact between the exterior surface of the parison wall and the surface of sleeve 28 is substantially continuous along the entire surface of sleeve 28 at end 30 so as to provide an optimum seal. This prevents blow gas from leaking from the cavity 14, around blow needle 22 and then under parison 12 between the parison and the mold halves. It should be apparent that if the projections were not spaced as described and shown, it would be difficult to achieve desirable and continuous sealing contact between the exterior surface of parison 12 and the surface of sleeve 28 at end 30, particularly in the areas between the projections. In addition, the space between the innermost projection inner boundary and the blow needle allows for gaps between the parison wall and the blow needle, which will be discussed further below in connection with operation of the apparatus.

The desired spacing between adjacent projections, between the innermost projection and the blow needle, and between the outermost projection and outer edge 44, are somewhat dependent upon the thickness of the parison wall and angle $\alpha$. To achieve good sealing contact, the spacing is generally increased for corresponding increases in parison wall thickness and/or decreases in angle $\alpha$. It is further preferable that the length of each projection be approximately equal to the distance between each adjacent projection as measured between their respective ends as shown at 50. This dimensional ratio generally optimizes the uniformity of the parison wall thickness across sleeve 28.

Operation of the embodiment shown in FIGS. 1–5 will now be described with reference to those Figures.

A parison is first positioned between two mold halves which are separated from one another. The parison is then pre-blown by injecting a gas, preferably air, into the parison from an extruder (not shown) which is located above the upper portion of the parison and the mold halves, while at the same time the lower portion of the parison below the mold halves is sealed; for example by a pair of prepinch arms (not shown). The parison is accordingly partially inflated, and the mold halves are then closed so as to define a cavity 14 therebetween in which the parison is positioned.

FIG. 1 shows parison 12 to be in the pre-blown condition as discussed above. As shown in FIGS. 1 and 3, the blow needle 22 and sleeve 28 are positioned in their respective retracted positions at this point in the method.

Blow needle 22 is then moved through passageway 36 from its retracted position to an extended position wherein the blow needle extends into the cavity 14 so as to puncture parison 12, thereby forming a blow hole, and extend into its interior. Injection of blow gas, typically air, from the outlet end 24 of blow needle 22 is typically initiated immediately after puncturing of the parison. This further inflates parison 12 so that the parison wall moves progressively closer to the interior surfaces of the mold halves.

Since sleeve 28 is attached to blow needle 22, sleeve 28 moves through passageway 36 in response to movement of blow needle 22 so as to move from a retracted position to an extended position wherein the projections extend into cavity 14. Depending upon the rate at which parison 12 is inflated after puncturing thereof, the projections may either come into contact with the exterior surface of parison 12 immediately upon the sleeve reaching its extended position, or the projections may come into contact with the parison after the sleeve reaches its extended position, in which case the parison 12 is pressed into contact with the projections due to the increasing air pressure within the parison. Note in particular, however, that parison 12 is punctured before the projections come into contact with the parison.

In any event and as shown in FIG. 4, the portion of parison 12 contacting the projections comes to conform to the shape of the projections so as to form sealing contact between the parison and end 30 of sleeve 28, such end 30 including the projections. Note in particular that puncturing of parison 12 has produced an irregular blow hole characterized by a gap between blow needle 22 and the parison wall as indicated at 56. Sealing contact between the parison wall and end 30 of sleeve 28 substantially prevents passage of blow gas from within parison 12 and into the area between the parison and the mold halves, thereby effectively preventing leakage of blow gas from the interior of the parison which can result in a poorly defined molded article. In addition, contact between parison 12 and the projections as shown in FIG. 4 serves to prevent movement of the parison wall away from blow needle 22, thereby preventing enlargement of gap 56.

Finally, inflation of the parison is completed and the parison is allowed to cool so as to form the finished molded article as shown for example in FIG. 5. Therefore in accordance with the invention, the desired gas pressure within the parison is maintained during inflation and cooling of the parison so as to ensure a well defined molded article, despite the formation of a bad blow hole characterized by the gap 56. Sleeve 28 and blow needle 22 are now retracted to their respective retracted positions within passageway 36, also as shown in FIG. 5. Retractability of sleeve 28 and blow needle 22 enables removal of the molded article from mold half 10 upon separation of the mold halves.

Figure 6:
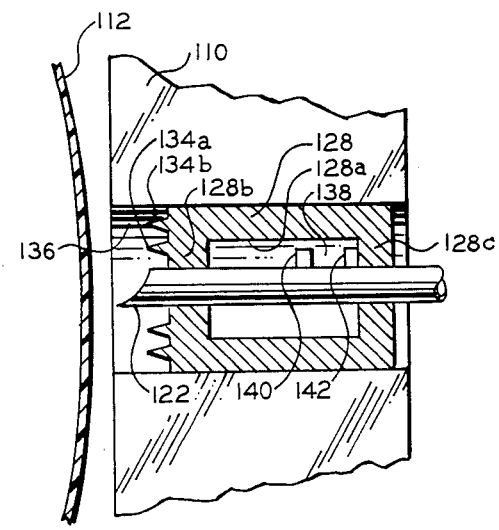
FIGS. 6–8 are views similar to FIGS. 3–5, but illustrate a second embodiment of the invention and operation thereof.
Figure 7:
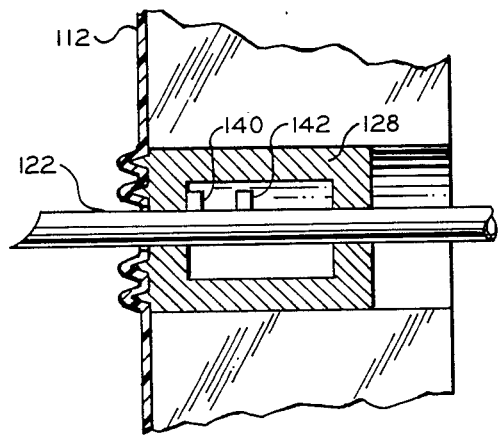
Figure 8:
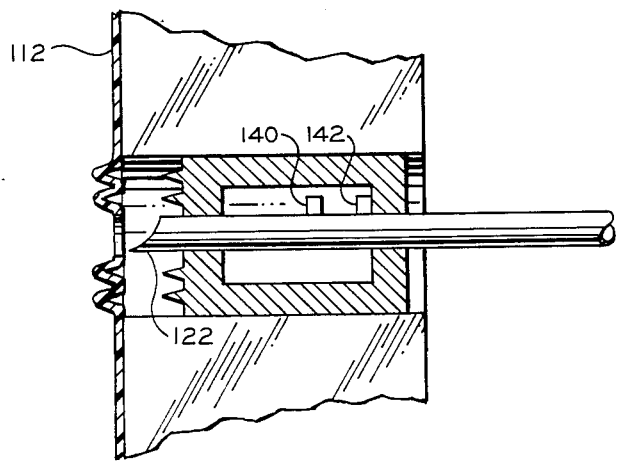

Referring now to FIGS. 6–8, a second embodiment of the invention is shown which utilizes different means for moving a sleeve between extended and retracted positions.

Referring first to FIG. 6, the illustrated apparatus is similar to the embodiment of FIGS. 1–5 insofar as including a parison 112, mold half 110, and a blow needle 122 reciprocably disposed in a passageway 136. The projections 134a and 134b and spacing thereof are also similar to that shown in FIGS. 1–5. However, sleeve 128, rather than being fixed to the blow needle, is freely reciprocable within the passageway and also with respect to blow needle 122. Sleeve 128 further has an inner surface 128a which faces blow needle 122, and first and second inwardly projecting portions 128b and 128c respectively. A space 138, generally annular in shape in the illustrated embodiment, is defined between inner surface 128a and blow needle 122 and between the inwardly and outwardly projecting portions 128b and 128c.

The illustrated apparatus further includes a first boss 140 and a second boss 142 which are longitudinally separated, with respect to the needle longitudinal axis, from one another. Each boss extends outwardly from blow needle 122 so as to be movable within space 138, with the needle, with respect to sleeve 128. The first boss is adapted to abut the first inwardly projecting portion 128b so as to move sleeve 128 to its extended position, as shown in FIG. 7, in response to movement of the blow needle to its extended position. The second boss 142 is adapted to abut second inwardly projecting portion 128c so as to move sleeve 128 to its retracted position, as shown in FIG. 8, in response to movement of the blow needle to its retracted position.

Of course it should be understood that one lengthy boss could be substituted for the two bosses shown in the illustrated embodiment.

Except for movement of the sleeve between its retracted and extended positions, the embodiment of FIGS. 6–8 operates substantially similar to that of the embodiment of FIGS. 1–5.

One advantage of the embodiment of FIGS. 6–8 over the embodiment of FIGS. 1–5 is that it is possible to provide a smaller open area as defined between the projections and the passageway end which communicates with the cavity. Note in particular the large area between the projections and passageway end 42 in FIG. 3, for example. This large open area is inherent in the embodiment of FIG. 3 since the sleeve 28 is attached to blow needle 22 and therefore must be positioned far enough back on blow needle 22 so that sleeve 28 and blow needle 22 move simultaneously to their extended positions. Such a large open area can lead to rupture of the parison if the parison is punctured and then inflated into the passageway 36 before sleeve 28 reaches its extended position. This is prevented somewhat by the embodiment of FIGS. 6–8 since the projections are close enough to the cavity to receive the parison and prevent rupture while sleeve 128 is still in its retracted position.

Obviously many modifications and variations of the present invention are possible in light of the above teachings. For example, the drive means for the above-described sleeve and blow needle could be mounted separately from either of the molded halves. According to another variation, the sleeve and blow needle could have independent drive means associated therewith so as to be independently operable. Or, it is within the scope of certain aspects of the invention to provide projections extending from at least one mold half wherein such projections are stationary. However in such an embodiment, the projections must be located so as to not interfere with removal of the molded article from the mold halves. It is therefore to be understood that within the scope of appended claims the invention may be practiced otherwise than as specifically described.

That which is claimed is:

1. A blow molding apparatus comprising:
   mold means which includes a pair of movable mold halves which are adapted to receive a parison in a cavity defined therebetween;
   blow means which includes a blow needle, having a longitudinal axis and a blow gas outlet end, which is adapted to puncture said parison with said gas outlet end and extend into the interior of said parison;
   sealing means which includes a plurality of generally concentric projections, each said projection completely surrounding said needle and having a first end, with inner and outer closed boundaries, and also a second end, wherein each said projection extends from said first end to said second end in a direction generally toward said cavity and generally parallel to said needle longitudinal axis, said sealing means being capable of assuming at least one position such that said projections extend into said cavity, whereby a parison can come into sealing contact with said projections at its exterior surface while said blow needle extends into the interior of said parison during blow molding thereof.

2. An apparatus as recited in claim 1 wherein said sealing means is selectively movable between said at least one position, hereafter referred to as a first extended position in which said projections extend into said cavity, and a first retracted position in which said projections are withdrawn from said cavity.

3. An apparatus as recited in claim 2 wherein said sealing means includes a generally annular sleeve which fits around said blow needle so as to be generally coaxial therewith, said sleeve having longitudinally separated, with respect to said needle longitudinal axis, first and second ends where said second end is closest to said blow gas outlet end of said needle, wherein said projections are located at the second end of said sleeve.

4. An apparatus as recited in claim 3 wherein said apparatus includes means for defining a passageway which extends through a portion of at least one of said mold halves and which has an end which communicates with said cavity, said sleeve being reciprocably disposed in said passageway so as to be movable between said first extended position and said first retracted position, said blow needle further being reciprocably disposed in said passageway so as to be movable between a second extended position where said blow needle extends into said cavity and a second retracted position where said blow needle is withdrawn from said cavity.

5. An apparatus as recited in claim 4 wherein said blow means further comprises means for effecting reciprocating movement of said blow needle between said second extended position and said second retracted position.

6. An apparatus as recited in claim 5 wherein the second end of said sleeve has an outer edge, said plurality of projections including an innermost projection closest to said needle and an outermost projection farthest from said needle, wherein the inner boundary of the first end of said innermost projection is spaced from said needle and wherein the inner boundary of the first end of each of the remaining projections is spaced from the outer boundary of the first end of an immediately adjacent projection, and further wherein the outer boundary of said outermost projection is spaced from the outer edge of said sleeve.

7. An apparatus as recited in claim 6 wherein said mold means has an interior surface which defines said cavity and wherein said means for defining said passageway comprises said portion of said at least one mold half, the outer edge of said sleeve being approximately flush with the interior surface of said mold means immediately adjacent to said passageway end when said sleeve is in said first extended position.

8. An apparatus as recited in claim 7 wherein said sleeve has an inner surface at which said sleeve is fixedly attached to said needle.

9. An apparatus as recited in claim 7 wherein said sleeve has an inner surface facing said needle and first and second inwardly projecting portions, a space being defined between said needle and said sleeve inner surface and between said inwardly projecting portions, said sleeve being freely reciprocable within said passageway and with respect to said needle, and wherein said apparatus further comprises boss means which includes at least one boss extending outwardly from said needle so as to be movable with said needle in said annular space with respect to said sleeve, said boss means being adapted to abut said first inwardly projecting portion of said sleeve so as to move said sleeve to said first extended position in response to movement of said needle to said second extended position, said boss means being also adapted to abut said second inwardly projecting portion of said sleeve so as to move said sleeve to said first retracted position in response to movement of said needle to said second retracted position.

10. An apparatus as recited in claim 9 wherein said boss means comprises a first boss and a second boss which are longitudinally separated, with respect to said needle longitudinal axis, from one another, said first boss being adapted to abut said first inwardly projecting portion and said second boss being adapted to abut said second inwardly projection portion.

11. An apparatus as recited in claim 7 wherein the second end of each said projection defines a generally sharp edge such that the cross-section of each said projection is generally triangular in shape.

12. An apparatus as recited in claim 11 wherein each said projection is generally annular.

13. An apparatus as recited in claim 12 wherein each said projection has a first side surface which extends from one of said boundaries at its first end to its second end, and a second side surface which extends from the other boundary to its second end so that each side surface connects at said second end, said side surfaces defining an acute angle therebetween of about 20 to about 30 degrees.

14. An apparatus as recited in claim 13 wherein said inner and outer boundaries of said projections are generally coplanar with respect to a plane which is generally perpendicular to said needle longitudinal axis.

* * * * *